United States Patent
Hong et al.

(10) Patent No.: US 10,613,667 B2
(45) Date of Patent: Apr. 7, 2020

(54) DISPLAY DEVICE

(71) Applicant: Samsung Display Co., Ltd., Yongin-si (KR)

(72) Inventors: Won Ki Hong, Yongin-si (KR); Tae Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/838,341

(22) Filed: Dec. 11, 2017

(65) Prior Publication Data

US 2018/0224992 A1 Aug. 9, 2018

(30) Foreign Application Priority Data

Feb. 3, 2017 (KR) .......... 10-2017-0015615

(51) Int. Cl.
*G06F 3/041* (2006.01)
*H01L 41/04* (2006.01)

(52) U.S. Cl.
CPC .......... *G06F 3/0414* (2013.01); *G06F 3/0412* (2013.01); *H01L 41/04* (2013.01); *G09G 2310/0264* (2013.01)

(58) Field of Classification Search
CPC .......... G05B 2219/40553; G06F 3/016; G06F 3/04886; G06F 3/0414; G06F 3/0412; B60W 50/16; F15B 13/14; H01H 13/85
See application file for complete search history.

(56) References Cited

U.S. PATENT DOCUMENTS

| | | | |
|---|---|---|---|
| 7,221,363 B2 * | 5/2007 | Roberts | B60Q 9/00 345/204 |
| 7,511,702 B2 | 3/2009 | Hotelling | |
| 7,538,760 B2 | 5/2009 | Hotelling et al. | |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,178,509 B2 | 11/2015 | Bernstein | |
| 9,274,660 B2 | 3/2016 | Bernstein et al. | |
| 9,513,663 B2 | 12/2016 | Jones et al. | |
| 2010/0097344 A1 * | 4/2010 | Verweg | G06F 3/044 345/174 |
| 2010/0156827 A1 * | 6/2010 | Joo | G02F 1/13338 345/173 |

(Continued)

*Primary Examiner* — William Lu
(74) *Attorney, Agent, or Firm* — H.C. Park & Associates, PLC

(57) ABSTRACT

A display device may include: a display panel; and a pressure sensor provided on one surface of the display panel, wherein the pressure sensor includes: a first substrate including: a first base substrate; and receiving electrodes disposed on the first base substrate, the receiving electrodes extending in a first direction; a second substrate disposed between the first substrate and the display panel, the second substrate including: a second base substrate; and driving electrodes disposed on a surface of the second base substrate facing the first substrate, the driving electrodes extending in a second direction crossing the receiving electrodes; and a variable resistance layer provided on a surface of one of the driving electrodes and the receiving electrodes, wherein the second base substrate includes a material configured for at least one of blocking light and absorbing light.

18 Claims, 6 Drawing Sheets

(56) References Cited

U.S. PATENT DOCUMENTS

| | | | |
|---|---|---|---|
| 2011/0273394 A1 | 11/2011 | Young et al. | |
| 2012/0313888 A1* | 12/2012 | Lee | G06F 3/044 |
| | | | 345/174 |
| 2014/0028575 A1 | 1/2014 | Parivar et al. | |
| 2014/0085213 A1 | 3/2014 | Huppi et al. | |
| 2015/0331517 A1* | 11/2015 | Filiz | G06F 3/0414 |
| | | | 345/173 |
| 2016/0170549 A1 | 6/2016 | Namkung | |
| 2016/0282999 A1* | 9/2016 | Hwang | G06F 3/044 |
| 2017/0003782 A1* | 1/2017 | Heo | G06F 3/044 |
| 2017/0031504 A1* | 2/2017 | Hwang | G06F 3/0488 |
| 2017/0315669 A1* | 11/2017 | Oh | G06F 3/0412 |
| 2018/0203562 A1* | 7/2018 | An | G06F 3/0416 |

\* cited by examiner

DISPLAY DEVICE

CROSS-REFERENCE TO RELATED APPLICATION

This application claims priority from and the benefit of Korean Patent Application No. 10-2017-0015615, filed on Feb. 3, 2017, which is hereby incorporated by reference for all purposes as if fully set forth herein.

BACKGROUND

Field

Exemplary embodiments relate to a display device that can sense applied pressure.

Discussion of the Background

According to increasing interest in information displays and an increase in demands for use of portable information media, research and commercialization of display devices have expanded.

A display device has an image display function and often includes a touch sensor for receiving a touch of a user. Accordingly, the user is capable of more conveniently using the display device through the touch sensor.

Furthermore, recently, display devices have tended to provide various functions to the user by using a pressure generated by a touch, as well as a touch position.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a display device including a pressure sensor.

Additional aspects will be set forth in the detailed description which follows, and, in part, will be apparent from the disclosure, or may be learned by practice of the inventive concepts.

According to exemplary embodiments, a display device may include: a display panel; and a pressure sensor provided on one surface of the display panel, wherein the pressure sensor includes: a first substrate including: a first base substrate; and receiving electrodes disposed on the first base substrate, the receiving electrodes extending in a first direction; a second substrate disposed between the first substrate and the display panel, the second substrate including: a second base substrate; and driving electrodes disposed on a surface of the second base substrate facing the first substrate, the driving electrodes extending in a second direction crossing the receiving electrodes; and a variable resistance layer provided on a surface of one of the driving electrodes and the receiving electrodes, wherein the second base substrate includes a material configured for at least one of blocking light and absorbing light.

The variable resistance layer may include: a polymer resin; and at least one of a piezo-electric material and a conductive material dispersed within the polymer resin.

Resistance of the variable resistance layer may be decreased according to an increase in a pressure.

The pressure sensor may further include a spacer which uniformly maintains a gap between the first substrate and the second substrate.

The display device may further include a cushion layer provided on an external surface of the first base substrate and including an elastically deformable material.

The pressure sensor may be provided on a surface of the display panel in a direction opposite to a light emission direction.

The display device may further include a window provided on a surface of the display panel in a light emission direction.

According to exemplary embodiments, a display device may include: a display panel; and a pressure sensor provided on one surface of the display panel, wherein the pressure sensor includes: a first substrate including: a first base substrate; and receiving electrodes disposed on the first base substrate, the receiving electrode extending in a first direction; a second substrate disposed between the first substrate and the display panel, the second substrate including: a second base substrate; and driving electrodes disposed on a surface of the second base substrate facing the first substrate, the driving electrode extending in a second direction crossing the receiving electrodes; and a variable resistance layer provided on a surface of one of the driving electrodes and the receiving electrodes, wherein the second base substrate includes an elastically deformable material.

The pressure sensor may be provided on a surface of the display panel in a direction opposite to a light emission direction.

The display device of claim may further include: light shielding layer provided between the display panel and the pressure sensor and comprising a material configured for blocking or absorbing light.

According to exemplary embodiments, a display device may include: a display panel including a light emitting surface through which light is emit; and a pressure sensor provided on the light emitting surface of the display panel, wherein the pressure sensor includes: a first substrate including: a first base substrate; and receiving electrodes disposed on the first base substrate, the receiving electrodes extending in a first direction; a second substrate including: a second base substrate; and driving electrodes disposed on a surface of the second base substrate facing the first substrate, the driving electrode extending in a second direction crossing the receiving electrodes; and a variable resistance layer provided on a surface of one of the driving electrodes and the receiving electrodes, wherein the first substrate is disposed between the display panel and the second substrate, and wherein the second base substrate includes a material allowing light to pass through.

The display device may further include a polarizing layer provided between the display panel and the first substrate.

The first base substrate may be a polarizing layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
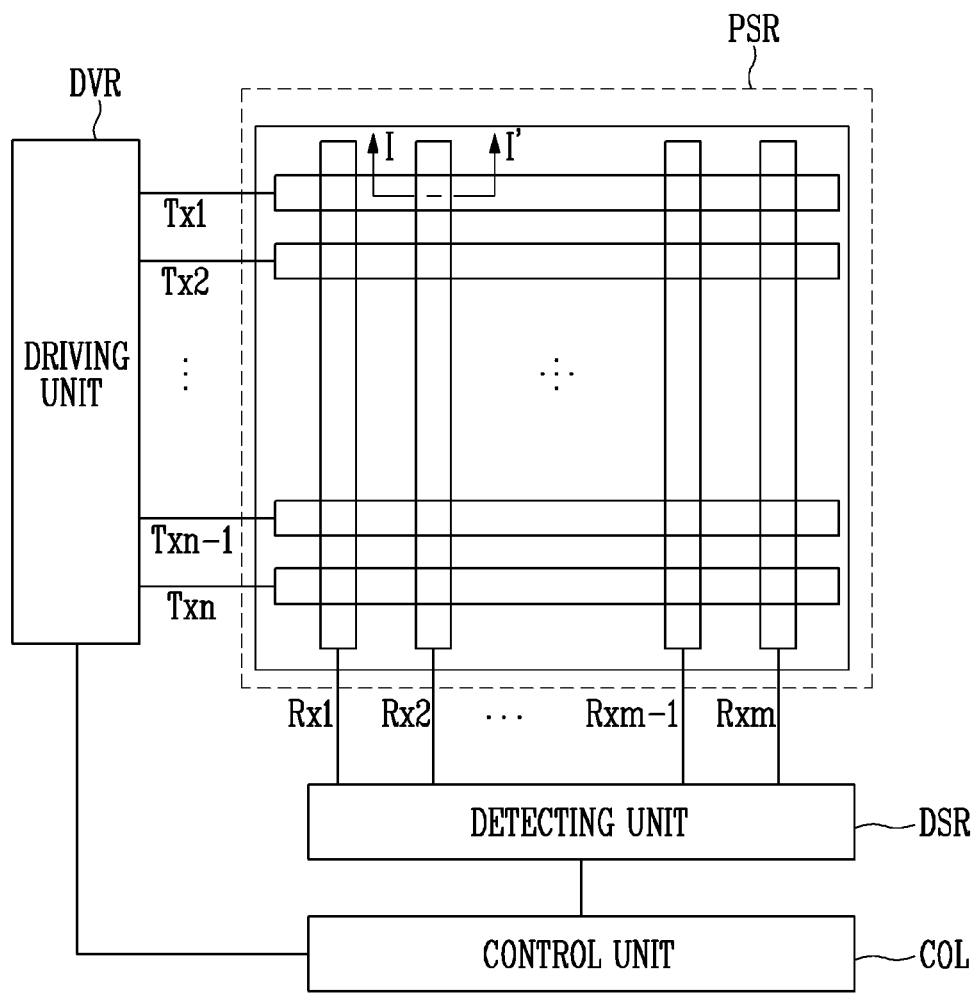
FIG. 1 is a schematic diagram illustrating a pressure sensor according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not necessarily intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
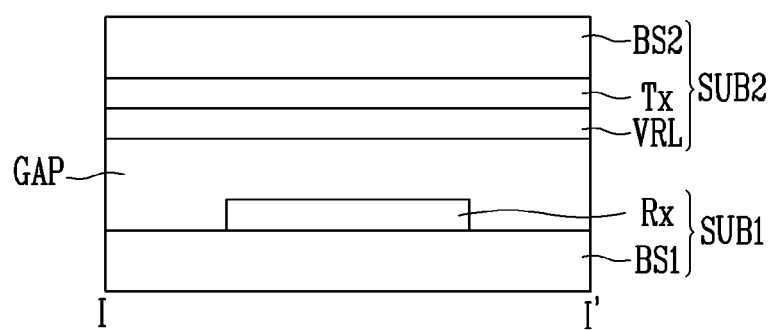
FIG. 2 is a cross-sectional view of the pressure sensor taken along line I-I' of FIG.
Figure 3:
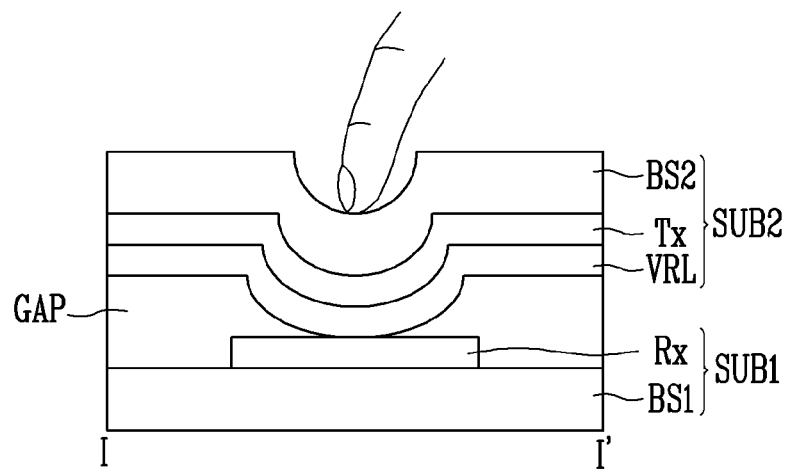
FIG. 3 is a cross-sectional view illustrating the pressure sensor with a pressure applied to the pressure sensor of FIG. 2, according to an exemplary embodiment.
Figure 4:
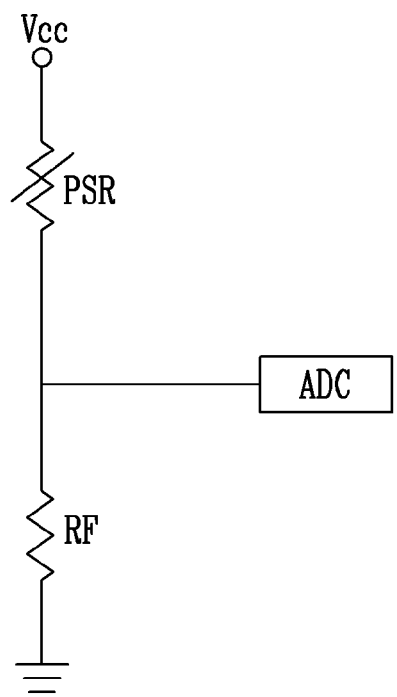
FIG. 4 is a circuit diagram for describing a pressure sensing principle of the pressure sensor illustrated in FIG. 1, according to an exemplary embodiment.

FIG. 1 is a schematic diagram illustrating a pressure sensor according to an exemplary embodiment of the present disclosure, FIG. 2 is a cross-sectional view of the pressure sensor taken along line I-I' of FIG. 1, FIG. 3 is a cross-sectional view illustrating the pressure sensor with a pressure applied to the pressure sensor of FIG. 2, and FIG. 4 is a circuit diagram for describing a pressure sensing principle of the pressure sensor illustrated in FIG. 1, according to the exemplary embodiments.

Referring to FIGS. 1, 2, 3, and 4, a pressure sensor may include a sensing unit PSR, a driving unit DVR transmitting a driving signal, a detecting unit DSR receiving a detection signal obtained by detecting a touch and a pressure, and a control unit COL controlling the driving unit DVR and the detecting unit DSR.

The sensing unit PSR may include a plurality of driving electrodes Tx and plurality of sensing electrodes Rx. The driving electrodes Tx may be extended in a predetermined direction, and may be repeatedly arranged parallel to one another. The receiving electrodes Rx may be extended in a direction crossing the driving electrodes Tx, and may be repeatedly arranged parallel to one another. That is, the driving electrodes Tx may be arranged crossing the receiving electrodes Rx.

According to the present exemplary embodiment, the sensing unit PSR including the driving electrodes Tx and the receiving electrodes Rx which cross one another has been described as an example, but the exemplary embodiments are not limited thereto. For example, the sensing unit PSR may also independently receive the driving signal and output the reception signal.

The sensing unit PSR may include a first substrate SUB1 including one of the driving electrodes Tx and the receiving electrodes Rx, for example, the receiving electrodes Rx, and a second substrate SUB2 including the other one of the driving electrodes Tx and the receiving electrodes Rx, for example, the driving electrodes Tx. The first substrate SUB1 and the second substrate SUB2 may be spaced apart from each other by a predetermined interval. That is, a gap may be formed between the first substrate SUB1 and the second substrate SUB2.

The first substrate SUB1 may include a first base substrate BS1, and the receiving electrodes Rx on the first base substrate BS1.

The second substrate SUB2 may include a second base substrate BS2, the driving electrodes Tx disposed on the second base substrate BS2, and a variable resistive layer VRL disposed on a surface in a direction of the first substrate SUB1 of the driving electrodes Tx.

The driving electrodes Tx and the receiving electrodes Rx may include a transparent conductive material. For example, the driving electrodes Tx and the receiving electrodes Rx may include at least one of a transparent conductive metal oxide, a conductive nano wire, graphene, and a metal mesh.

Resistance of the variable resistive layer VRL may be changed according to pressure. For example, resistance of the variable resistive layer VRL may be decreased according to an increase in pressure. The variable resistive layer VRL may include a polymer resin, and at least one of a piezo-electric material and a conductive material dispersed within the polymer resin. The piezo-electric materials may include a lead zirconate titanate (PZT). The conductive material may include at least one of carbon powder, metal powder, conductive nano particles, conductive nano tube, and graphene. The conductive nano particle may include a transparent conductive oxide and a metal material. The conductive nano tube may include a carbon nano tube. According to the present exemplary embodiment, the resistance of the variable resistive layer VRL is decreased according to the increase in pressure has been described, but the exemplary embodiments are not limited thereto. For example, resistance of the variable resistive layer VRL may be increased according to an increase in pressure.

The first base substrate BS1 and the second base substrate BS2 may include a material that may support the driving electrodes Tx and the receiving electrodes Rx.

When a pressure is applied to the sensing unit PSR, a substrate, for example, the second substrate SUB2, in the application direction of the pressure may be transformed. When the second substrate SUB2 is transformed, the variable resistive layer VRL is in contact with the receiving electrodes Rx, and a current may flow from the driving electrodes Tx to the receiving electrodes Rx through the variable resistive layer VRL.

Herein, the variable resistive layer VRL includes a material, of which resistance is decreased according to an increase in pressure. Therefore, when the driving signal having a constant current is applied to the driving electrodes Tx, a voltage of a detection signal transmitted to the detecting unit DSR from the receiving electrodes Rx may be decreased. Furthermore, when the driving signal having a constant voltage is applied to the driving electrodes Tx, a current of the detection signal transmitted to the detecting unit DSR from the receiving electrodes Rx may be increased.

The driving unit DVR may transmit the driving signal to the driving electrodes Tx. For example, the driving unit DVR may sequentially apply the driving signal to the driving electrodes Tx. The driving unit DVR may also apply the driving signal to the driving electrodes Tx at the same time.

The detecting unit DSR may receive the detection signal from the receiving electrodes Rx. The detection signal may include information on a position to which a pressure is applied, and information on a voltage value or a current value transmitted from the receiving electrodes Rx. For example, the detection signal may include the information on a position, to which a pressure is applied, and information on a voltage value transmitted from the receiving electrodes Rx.

The detecting unit DSR may include a receiver connected with the receiving electrodes Rx through a switch. The switch may be turned on for a detection period of a signal of a corresponding receiving electrode Rx to allow the detection signal from the receiving electrode Rx to be detected by the receiver.

The detecting unit DSR may further include an Analog to Digital Converter (ADC) converting analog data received through the receiver into digital data.

The ADC may convert a size of a pressure applied to the sensing unit PSR by using Equation 1 below.

$$V_{ADC} = V_{cc} \times [R_F/(R_F+R_S)] \qquad \text{[Equation 1]}$$

Herein, $V_{ADC}$ may be a voltage value converted by the ADC, $V_{cc}$ may be a voltage value applied to the pressure sensors, $R_F$ may be filter resistance, and $R_S$ may be resistance of the receiving electrode.

That is, the voltage value converted by the ADV may be changed according to a size of a pressure applied to the sensing unit PSR.

The control unit COL may generate a driving control signal, and then transmit the driving control signal to the driving unit DVR. The driving unit DVR receiving the driving control signal converts the driving control signal to a driving signal of the driving electrodes Tx, and transmits the driving signal to the driving electrodes Tx.

Furthermore, the control unit COL may generate a detection control signal, and then transmit the detection control signal to the detecting unit DSR. The detecting unit DSR may receive the detection signal from the receiving electrodes Rx according to the detection control signal.

Hereinafter, exemplary embodiments of a display device including the pressure sensor illustrated in FIGS. 1, 2, 3, and 4 will be described with reference to FIGS. 5, 6, 7, 8, 9, 10, 11, and 12.

Figure 5:
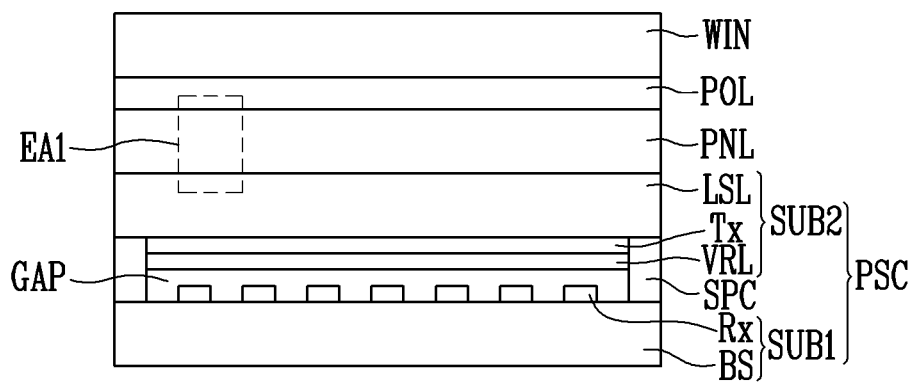
FIG. 5, FIG. 6, FIG. 8, FIG. 9, FIG. 10, FIG. 11, and FIG. 12 are cross-sectional views of exemplary embodiments of a display device including the pressure sensor illustrated in FIG. 1, FIG. 2, FIG. 3, and FIG. 4.
Figure 6:
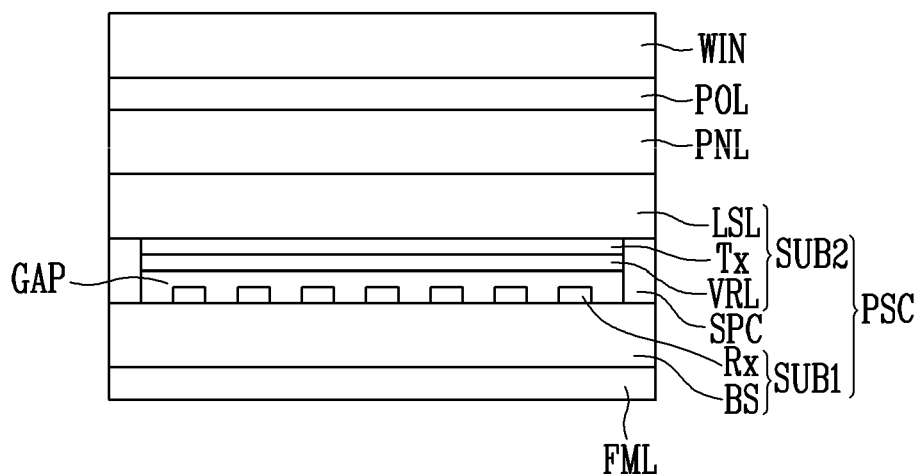

FIGS. 5 and 6 are cross-sectional views of exemplary embodiments of a display device including the pressure sensor illustrated in FIGS. 1, 2, 3, and 4, and FIG. 7 is an enlarged view of a region EA1 of FIG. 5, according to an exemplary embodiment.

Figure 7:
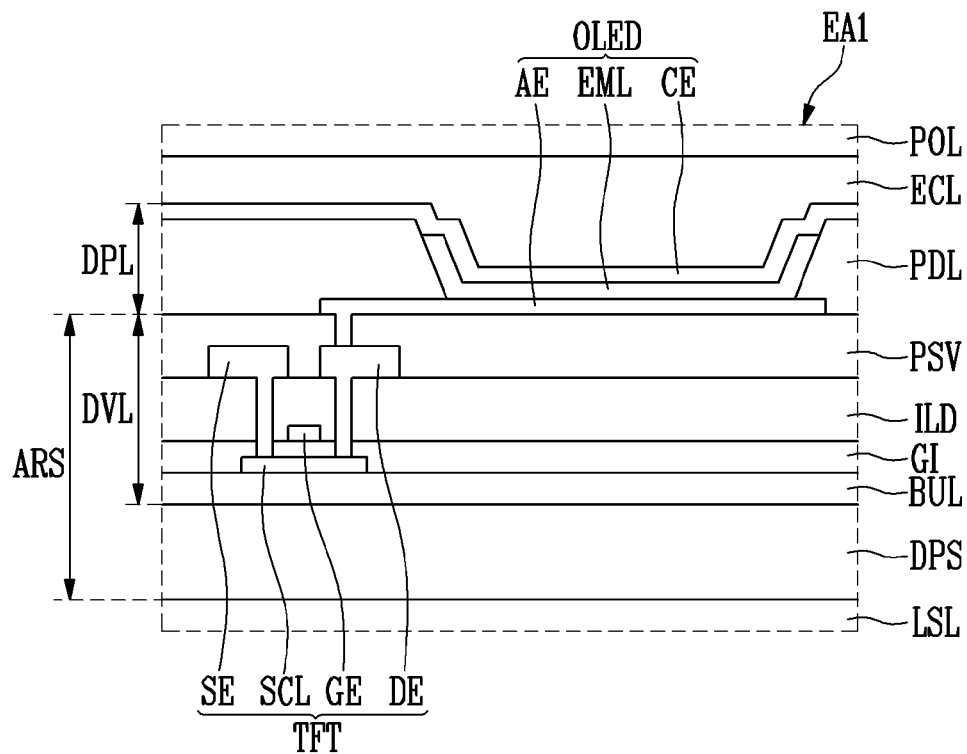
FIG. 7 is an enlarged view of a region EA1 of FIG. 5, according to an exemplary embodiment.

Referring to FIGS. 5, 6, and 7, a display device may include a display panel PNL displaying an image, a window WIN provided on one surface, for example, a surface in a light emission direction, between both surfaces of the display panel PNL, and a pressure sensor PSC provided on the other surface of the display panel PNL.

The display panel PNL may have various planar shapes. For example, the display panel PNL may have a polygonal shape in a closed form including a straight side. Furthermore, the display panel PNL may have a shape, such as a circle and an ellipse including a curve side. Furthermore, the display panel PNL may have a shape, such as a semi-circle and a semi-ellipse including a side formed of a straight line and a curve line.

The display panel PNL may include a display area, and a non-display area provided in a peripheral area of the display area.

A plurality of pixels may be provided in the display area. Furthermore, a plurality of gate lines, and a plurality of data lines crossing the plurality of gate lines may be provided in the display area. Each of the pixels may include one or more thin film transistors TFT connected to one of the gate lines and one of the data lines, and a display element OLED connected with the thin film transistors TFT.

The display element OLED device may be any one of a liquid crystal display element (LCD element), an electrophoretic display element (EPD element), an electrowetting display element (EWD element), and an organic light emitting display element (OLED element). In the meantime, for convenience of the description, the organic light emitting display element will be described as an example of the display element OLED hereinafter.

Referring to FIG. 7, a structure of the display panel PNL will be described according to a lamination sequence.

In the display area, the display panel PNL may include an array substrate ARS, and a display layer DPL provided on the array substrate ARS.

The array substrate ARS may include an insulating substrate DPS, and a driving layer DVL provided on the insulating substrate DPS.

The insulating substrate DPS includes a transparent insulating material to allow light to pass through. The insulating substrate DPS may be a rigid substrate. For example, the insulating substrate DPS may be at least one of a glass base substrate, a quartz base substrate, a glass ceramic base substrate, and a crystalline glass base substrate.

The insulating substrate DPS may also be a flexible substrate. The insulating substrate DPS may be at least one of a film substrate and a plastic substrate including a polymer organic material. For example, the insulating substrate DPS may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the insulating substrate DPS may be variously changed, and the insulating substrate DPS may also include Fiber Glass Reinforced Plastic (FRP), and the like.

In the pixel, the driving layer DVL may include one or more thin film transistors TFT.

The thin film transistor TFT may include a semiconductor layer SCL, a gate electrode GE insulated from the semiconductor layer SCL, and a source electrode SE and a drain electrode DE connected to the semiconductor layer SCL.

The semiconductor layer SCL may be disposed on the insulating substrate DPS. The semiconductor layer SCL may include any one of amorphous silicon (a-Si), polycrystalline silicon (p-Si), an oxide semiconductor, and an organic semiconductor. The oxide semiconductor may include at least one of Zn, In, Ga, Sn, and a mixture thereof. For example, the oxide semiconductor may include an indium-gallium-zinc oxide (IGZO).

In the semiconductor layer SCL, regions connected with the source electrode SE and the drain electrode DE may be a source region and a drain region, respectively, into which impurities are doped or injected. Also, a channel region may be disposed between the source region and the drain region.

In the meantime, although not illustrated, when the semiconductor layer SCL includes an oxide semiconductor, a light blocking layer for blocking light incident into the semiconductor layer SCL may also be disposed on upper and lower parts of the semiconductor layer SCL.

A buffer layer BUL may be disposed between the insulating substrate DPS and the semiconductor layer SCL. The buffer layer BUL may prevent or reduce impurities from being diffused from the insulating substrate DPS and permeating to the semiconductor layer SCL, preventing or reducing a degradation of an electric characteristic of the thin film transistor.

The buffer layer BUL may include at least one of an organic insulating layer and an inorganic insulating layer. The organic insulating layer may include an organic insulating material, which allows light to pass through. For example, the organic insulating layer may include at least one of polyacryl-based resin (polyacrylate resin), epoxy-based resin, phenol-based resin, polyamide-based resin, polyimide-based resin, unsaturated polyester-based resin, poly-phenylene ether-based resin, poly phenylenesulfide-based resin, and benzocyclobutene resin. The inorganic insulating layer may include at least one of a silicon oxide (SiOx) and a silicon nitride (SiNx). For example, the inorganic insulating layer may include a first film including a silicon oxide, and a second film, which is disposed on the first film and includes a silicon nitride.

Furthermore, the buffer layer BUL may prevent or reduce moisture and oxygen from permeating to the display element OLED from the outside. The buffer layer BUL may also planarize a surface of the insulating substrate DPS.

A gate insulating layer GI covering the semiconductor layer SCL may be disposed on the insulating substrate DPS and the semiconductor layer SCL. The gate insulating layer GI may insulate the semiconductor layer SCL and the gate electrode GE. The gate insulating layer GI may include at least one of an organic insulating layer and an inorganic insulating layer, like the buffer layer BUL.

The gate electrode GE may be disposed on the gate insulating layer GI. At least a part of the gate electrode GE may overlap the semiconductor layer SCL. The gate electrode GE may also include a conductive material.

An interlayer insulating layer ILD may be disposed on the gate insulating layer GI and the gate electrode GE. That is, the interlayer insulating layer ILD may cover the gate electrode GE. The interlayer insulating layer ILD may include at least one of an organic insulating layer and an inorganic insulating layer, like the gate insulating layer GI. A part of the interlayer insulating layer ILD may be removed to expose a part of the source region and a part of the drain region of the semiconductor layer SCL.

The source electrode SE and the drain electrode DE may be disposed on the interlayer insulating layer ILD. The source electrode SE and the drain electrode DE may be insulated from the gate electrode GE by the interlayer insulating layer ILD. The source electrode SE and the drain electrode DE may be connected with the source region and the drain region, respectively. The source electrode SE and the drain electrode DE may include a conductive material. For example, the source electrode SE and the drain electrode DE may include at least one of gold (Au), silver (Ag), aluminum (Al), copper (Cu), tin (Sn), molybdenum (Mo), titanium (Ti), nickel (Ni), and a conductive oxide.

According to the present exemplary embodiment, the thin film transistor TFT is a thin film transistor having a top gate structure, but the thin film transistors of the exemplary embodiments are not limited thereto. For example, the thin film transistor TFT may be a thin film transistor having a bottom gate structure.

The driving layer DVL may further include a passivation layer PSV covering the thin film transistor TFT. The passivation layer PSV may expose a part of the drain electrode DE.

The passivation layer PSV may include at least one layer. For example, the passivation layer PSV may include at least one of an inorganic passivation layer and an organic passivation layer. For example, the passivation layer PSV may include the inorganic passivation layer covering the thin film transistor TFT, and an organic passivation layer disposed on the inorganic passivation layer.

The display layer DPL may be disposed on the passivation layer PSV. In the pixel, the display layer DPL may include the display element OLED connected to the thin film transistor TFT.

The display element OLED may include a first electrode AE connected with the drain electrode DE, an emitting layer EML disposed on the first electrode AE, and a second electrode CE disposed on the emitting layer EML.

One of the first electrode AE and the second electrode CE may be an anode electrode and the other may be a cathode electrode. For example, the first electrode AE may be an anode electrode, and the second electrode CE may be a cathode electrode.

At least one of the first electrode AE and the second electrode CE may be a transmissive electrode. For example, when the display element OLED is a bottom emission type organic light emitting element, the first electrode AE may be a transmissive electrode, and the second electrode CE may be a reflective electrode. When the display element OLED is a top emission type organic light emitting element, the first electrode AE may be a reflective electrode, and the second electrode CE may be a transmissive electrode. When the display element OLED is a dual emission type organic light emitting element, both the first electrode AE and the second electrode CE may be transmissive electrodes. In the description below, the present disclosure will be described based on the case where the first electrode AE is an anode electrode and the display element OLED is a top emission type as an example.

The first electrode AE may be disposed on the passivation layer PSV. The first electrode AE may include a reflective layer, which is capable of reflecting light, and a transparent conductive layer disposed in an upper portion or a lower portion of the reflective layer. At least one of the reflective layer and the transparent conductive layer may be connected with the drain electrode DE.

The reflective layer may include a material, which is capable of reflecting light. For example, the reflective layer may include at least one of aluminum (Al), silver (Ag), chrome (Cr), molybdenum (Mo), platinum (Pt), nickel (Ni), and an alloy thereof.

The transparent conductive layer may include a transparent conductive oxide. For example, the transparent conductive layer may include at least one transparent conductive oxide among an indium tin oxide (ITO), an indium zinc oxide (IZO), an aluminum zinc oxide (AZO), a gallium doped zinc oxide (GZO), a zinc tin oxide (ZTO), a Gallium tin oxide (GTO), and a fluorine doped tin oxide (FTO).

A pixel defining layer PDL may be disposed on the first electrode AE and the passivation layer PSV. The pixel defining layer PDL may expose a part of the first electrode AE. For example, the pixel defining layer PDL may have a shape covering an edge of the first electrode AE and the passivation layer PSV.

The pixel defining layer PDL may include an organic insulating material. For example, the pixel defining layer PDL may include at least one of polystyrene, polymethylmetaacrylate (PMMA), polyacrylonitrile (PAN), polyamide (PA), polyimide (PI), polyarylether (PAE), heterocyclic polymer, parylene, epoxy resin, benzocyclobutene (BCB) based resin, siloxane based resin, and silane based resin.

The emitting layer EML may have a multilayer thin film structure including at least a light generation layer LGL. For example, the emitting layer EML may include a hole injection layer (HIL) for injecting holes, a hole transport layer (HTL), which has an excellent or improved hole transporting property and blocks a movement of an electron which fails to be combined in the light generation layer, to increase the recombination rate of the holes and the electrons in the light generation layer, the light generation layer emitting light through the recombination of the injected electrons and holes, a hole blocking layer (HBL) for blocking a movement of a hole which fails to be combined in the light generation layer, an electron transport layer (ETL) smoothly transporting electrons to the light generation layer, and an electron injection layer (EIL) injecting electrons. Herein, the hole injection layer, the hole transport layer, the electron transport layer, and the electron injection layer may be extended to adjacent pixels and thus may be common layers shared by the pixels. A color of light generated in the light generation layer may be any one of red, green, blue, and white, but the exemplary embodiments are not limited thereto. For example, a color of light generated in the light generation layer may one of magenta, cyan, and yellow.

The second electrode CE may be disposed on the emitting layer EML. The second electrode CE may be a semi-transmissive reflective layer. For example, the second electrode CE may be a thin metal layer having a thickness that light may pass through. The second electrode CE may allow a part of light generated in the emitting layer EML to pass through, and reflect the remaining part of the light generated in the emitting layer EML. The light reflected from the second electrode CE may be reflected at the reflective layer of the first electrode AE and pass through the second electrode CE by constructive interference.

The second electrode CE may include a material having a lower work function than that of the transparent conductive layer of the first electrode AE. For example, the second electrode CE may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chrome (Cr), calcium (Ca), and an alloy thereof.

An encapsulation layer ECL may be provided on the second electrode CE. The encapsulation layer ECL may isolate or protect the display element OLED from an outside environment. For example, the encapsulation layer ECL may prevent or reduce external moisture and oxygen from permeating into the display element OLED. The encapsulation layer ECL may be a thin film encapsulation layer including a plurality of inorganic layer and a plurality of organic layer disposed on the second electrode CE. For example, the encapsulation layer ECL may have a structure, in which the inorganic layers and the organic layers are alternately laminated.

According to the present exemplary embodiment, the display element OLED includes the encapsulation layer ECL to be isolated from an external environment as the example, but the exemplary embodiments are not limited thereto. In order to isolate the display element OLED from an external environment, an encapsulation substrate may also be applied instead of the encapsulation layer ECL. The encapsulation substrate may be bonded with the insulating substrate DPS through a sealant. When the display element OLED is isolated from an external environment by using the encapsulation substrate, the encapsulation layer ECL may also be omitted.

The window WIN may have a shape corresponding to the display panel PNL. Furthermore, the window WIN may have a planar shape having both surfaces. The window WIN may include a material which may pass through light. For example, the window WIN may be formed of glass or a transparent polymer resin. Furthermore, the window WIN may prevent or reduce damage to the display panel PNL by external impact.

A polarizing layer POL may be provided between the display panel PNL and the window WIN. The polarizing layer POL may prevent or reduce external light from being reflected in the display panel PNL. For example, the polarizing layer POL may include a linear polarizing layer, and a ¼λ retardation plate disposed on the linear polarizing layer.

The pressure sensor PSC may include a first substrate SUB1, a second substrate SUB2, and a spacer SPC.

The first substrate SUB1 may include a base substrate BS, and the receiving electrodes Rx provided on the base substrate BS.

The base substrate BS may support the receiving electrodes Rx. That is, the base substrate BS may be the first base substrate BS1 illustrated in FIGS. 2 and 3. Furthermore, the base substrate BS may include the same material as that of the insulating substrate DPS. That is, the base substrate BS may be a rigid substrate or a flexible substrate.

The second substrate SUB2 may be provided between the display panel PNL and the first substrate SUB1. The second substrate SUB2 may include a light shielding layer LSL, the driving electrodes Tx provided on a surface of the light shielding layer LSL facing the first substrate SUB1, and a variable resistance layer VRL provided on the driving electrodes Tx.

The light shielding layer LSL may prevent or reduce external light passing through the display panel PNL or light generated in the display panel PNL from moving in a direction of the pressure sensor PSC. The light shielding layer LSL may include a material configured for absorbing and/or blocking light. For example, the light shielding layer LSL may include a polymer resin, and a dye or a pigment dispersed within the polymer resin and is capable of absorbing and/or blocking light. Furthermore, the light shielding layer LSL may support the driving electrodes Tx. That is, the light shielding layer LSL may be the second base substrate BS2 illustrated in FIGS. 2 and 3.

The driving electrodes Tx and the receiving electrodes Rx may include a conductive material. For example, the driving electrodes Tx and the receiving electrodes Rx may include at least one of a conductive metal, a conductive metal oxide, and a metal mesh.

Resistance of the variable resistive layer VRL may be changed according to pressure. For example, resistance of the variable resistive layer VRL may be decreased according to an increase in pressure. The variable resistive layer VRL may include a polymer resin, and at least one of a piezo-electric material and a conductive material dispersed within the polymer resin. The piezo-electric material may include a lead zirconate titanate (PZT). The conductive material may include at least one of carbon powder, metal powder, conductive nano particles, conductive nano tube, and graphene. The conductive nano particle may include a transparent conductive oxide and a metal material. The conductive nano tube may include a carbon nano tube.

The spacer SPC may uniformly maintain a gap between the first substrate SUB1 and the second substrate SUB2 when the pressure is not applied to the pressure sensor PSC. That is, a gap GAP may be formed between the first substrate SUB1 and the second substrate SUB2 by the spacer SPC.

As described above, in the pressure sensor PSC, the light shielding layer LSL of the second substrate SUB2 may serve as the base substrate supporting the driving electrodes Tx. Accordingly, compared to a display device using a separate substrate supporting the driving electrodes Tx, a thickness of the display device including the pressure sensor PSC may be decreased.

Furthermore, when a pressure is applied to the pressure sensor PSC, one of the first substrate SUB1 and the second substrate SUB2 is transformed, so that the first substrate SUB1 may be in contact with the second substrate SUB2. After the pressure is removed from the pressure sensor PSC, the first substrate SUB1 and the second substrate SUB2 may be restored to a state spaced by the spacer SPC. That is, at least one of the first substrate SUB1 and the second substrate SUB2 is transformed, so that the pressure sensor PSC may absorb the pressure applied to the display device, and when the pressure is removed, the pressure sensor PSC may be restored into the original form. Accordingly, the pressure sensor PSC may serve as a cushion layer, which is capable of absorbing external pressure.

According to the present exemplary embodiment, the pressure sensor PSC is provided on the surface, through which light is not emitted, between both surfaces of the display panel PNL, but the exemplary embodiments are not limited thereto. For example, the pressure sensor PSC may also be provided on the surface, through which light is emitted, between both surfaces of the display panel PNL.

Furthermore, as illustrated in FIG. 6, the display device may further include a cushion layer FML provided on one surface of the pressure sensor PSC, for example, an external surface of the base substrate BS. The cushion layer FML may include an elastically deformable material. For example, the cushion layer FML may include polyurethane or polyurethane foam. The cushion layer FML may absorb external impact, for example, impact according to a drop of the display device. Accordingly, the display device including the cushion layer FML may effectively absorb external impact.

Figure 8:
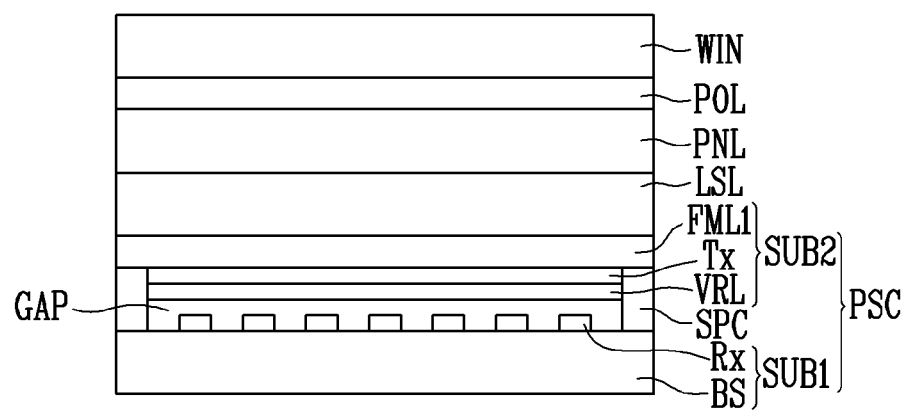
Figure 9:
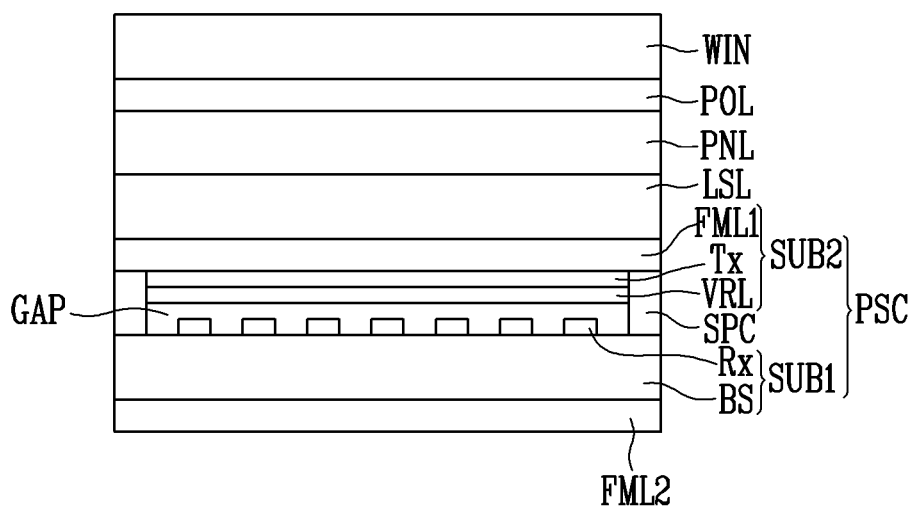

FIGS. 8 and 9 are cross-sectional views of exemplary embodiments of a display device including the pressure sensor illustrated in FIGS. 1, 2, 3, and 4.

Referring to FIGS. 8 and 9, the display device displaying an image may include a display panel PNL, a window WIN provided on one surface between both surfaces of the display panel PNL, a polarizing layer POL between the display panel PNL and the window WIN, a pressure sensor PSC provided on the other surface between both surfaces of the display panel PNL, and a light shielding layer LSL provided between the display panel PNL and the pressure sensor PSC.

The display panel PNL may include a display area, and a non-display area provided in a peripheral area of the display area. A plurality of pixels may be provided in the display area. Furthermore, a plurality of gate lines, and a plurality of data lines crossing the plurality of gate lines may be provided in the display area. Each of the pixels may include one or more thin film transistors TFT (see the transistor TFT of FIG. 7) connected to one of the gate lines and one of the data lines, and a display element OLED (see the display element OLED of FIG. 7) connected with the thin film transistors TFT.

The window WIN may be provided on one surface, for example, a surface in a light emission direction, between both surfaces of the display panel PNL. The window WIN may protect a surface of the display panel PNL.

The polarizing layer POL may prevent or reduce external light from being reflected in the display panel PNL.

The pressure sensor PSC may include a first substrate SUB1, a second substrate SUB2, and a spacer SPC.

The first substrate SUB1 may include a base substrate BS, and receiving electrodes Rx provided on the base substrate BS. The base substrate BS may support the receiving electrodes Rx. That is, the base substrate BS may be the first base substrate BS1 illustrated in FIGS. 2 and 3.

The second substrate SUB2 may include a first cushion layer FML1, driving electrodes Tx provided on a surface of the first cushion layer FML1 facing the first substrate SUB1, and a variable resistance layer VRL provided on the driving electrodes Tx.

The first cushion layer FML1 may support the driving electrodes Tx. That is, the first cushion layer FML1 may be the second base substrate BS2 illustrated in FIGS. 2 and 3. Furthermore, the first cushion layer FML1 may include an elastically deformable material. For example, the first cushion layer FML1 may include polyurethane or polyurethane foam. Accordingly, the first cushion layer FML1 may absorb external impact, for example, impact according to a drop of the display device.

Furthermore, the first cushion layer FML1 may be deformed by external impact or a touch pressure of a user. When the first cushion layer FML1 is deformed, the driving electrodes Tx and the variable resistive layer VRL may also be deformed. When the driving electrodes Tx and the variable resistive layer VRL are deformed, the variable resistive layer VRL may contact the receiving electrodes Rx, and resistance of the variable resistive layer VRL may be changed according to a size of a pressure.

The spacer SPC may uniformly maintain a gap between the first substrate SUB1 and the second substrate SUB2.

The light shielding layer LSL may prevent or reduce external light passing through the display panel PNL or light generated in the display panel PNL from moving in a direction of the pressure sensor PSC. The light shielding layer LSL may include a polymer resin, and a dye or a pigment dispersed within the polymer resin and is capable of absorbing light.

As described above, the first cushion layer FML1 of the second substrate SUB2 in the pressure sensor PSC may serve as a base substrate supporting the driving electrodes Tx. Accordingly, compared to a display device using a separate substrate supporting the driving electrodes Tx, a thickness of the display device including the pressure sensor PSC may be decreased.

As illustrated in FIG. 9, the display device may further include a second cushion layer FML2 provided on one surface of the pressure sensor PSC, for example, an external surface of the base substrate BS. The second cushion layer FML2 may include the same material as that of the first cushion layer FML1. Accordingly, the second cushion layer FML2 may absorb external impact together with the first cushion layer FML1.

Figure 10:
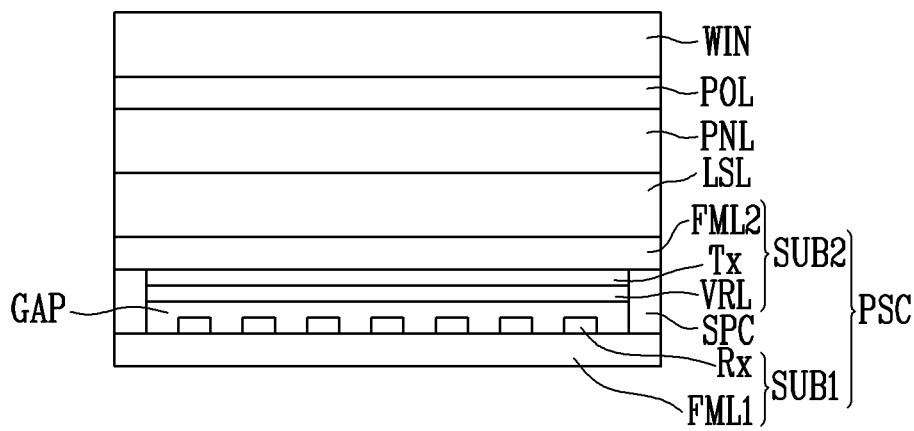

FIG. 10 is a cross-sectional view of an exemplary embodiment of a display device including the pressure sensor illustrated in FIGS. 1, 2, 3, and 4.

Referring to FIG. 10, the display device displaying an image may include a display panel PNL, a window WIN provided on one surface between both surfaces of the display panel PNL, a polarizing layer POL between the display panel PNL and the window WIN, a pressure sensor PSC provided on the other surface between both surfaces of the display panel PNL, and a light shielding layer LSL provided between the display panel PNL and the pressure sensor PSC.

A plurality of pixels may be provided in the display area of the display panel PNL. Furthermore, a plurality of gate lines, and a plurality of data lines crossing the plurality of gate lines may be provided in the display area. Each of the pixels may include one or more thin film transistors TFT (see the transistor TFT of FIG. 7) connected to one of the gate lines and one of the data lines, and a display element OLED (see the display element OLED of FIG. 7) connected with the thin film transistors TFT.

The window WIN may be provided on one surface, for example, a surface in a light emission direction, between both surfaces of the display panel PNL. The window WIN may protect a surface of the display panel PNL.

The polarizing layer POL may prevent or reduce external light from being reflected in the display panel PNL.

The pressure sensor PSC may include a first substrate SUB1, a second substrate SUB2, and a spacer SPC.

The first substrate SUB1 may include a first cushion layer FML1 and receiving electrodes Rx provided on the cushion layer FML1.

The second substrate SUB2 may include a second cushion layer FML2, driving electrodes Tx provided on a surface of the second cushion layer FML2 facing the first substrate SUB1, and a variable resistance layer VRL provided on the driving electrodes Tx.

The first cushion layer FML1 and the second cushion layer FML2 may support the receiving electrodes Rx and the driving electrodes Tx. That is, the first cushion layer FML1 and the second cushion layer FML2 may be the first base substrate BS1 and the second base substrate VS2 illustrated in FIGS. 2 and 3.

The first cushion layer FML1 and the second cushion layer FML2 may include an elastically deformable material. For example, the first cushion layer FML1 and the second cushion layer FML2 may include polyurethane or polyurethane foam. Accordingly, the first cushion layer FML1 and the second cushion layer FML2 may absorb external impact, for example, impact according to a drop of the display device.

The spacer SPC may uniformly maintain a gap between the first substrate SUB1 and the second substrate SUB2.

The light shielding layer LSL may prevent or reduce external light passing through the display panel PNL or light generated in the display panel PNL from moving in a direction of the pressure sensor PSC.

As described above, the first cushion layer FML1 and the second cushion layer FML2 in the pressure sensor PSC may serve as a base substrate supporting the receiving electrodes Rx and the driving electrodes Tx. Accordingly, compared to a display device using a separate substrate supporting the driving electrodes Tx, a thickness of the display device including the pressure sensor PSC may be decreased.

Figure 11:
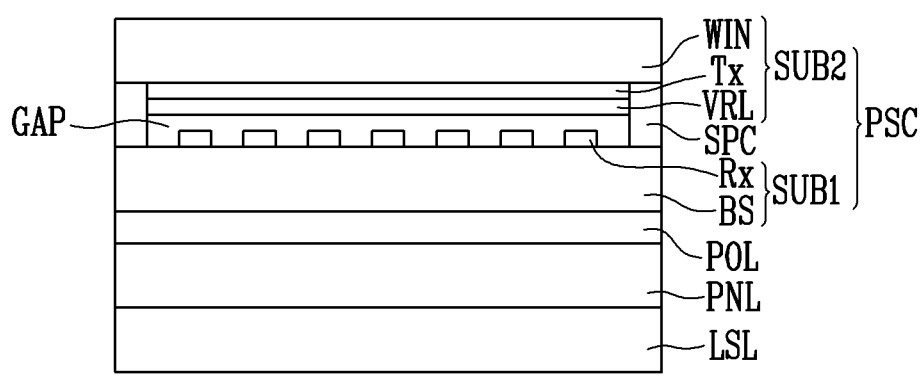

FIG. 11 is a cross-sectional view of an exemplary embodiment of a display device including the pressure sensor illustrated in FIGS. 1, 2, 3, and 4.

Referring to FIG. 11, a display device displaying an image may include a display panel PNL, a pressure sensor PSC provided on one surface between both surfaces of the display panel PNL, a polarizing layer POL between the display panel PNL and the pressure sensor PSC, and a light shielding layer LSL provided on the other surface between both surfaces of the display panel PNL.

A plurality of pixels may be provided in the display area of the display panel PNL. Furthermore, a plurality of gate lines, and a plurality of data lines crossing the plurality of gate lines may be provided in the display area. Each of the pixels may include one or more thin film transistors TFT (see the transistor TFT of FIG. 7) connected to one of the gate lines and one of the data lines, and a display element OLED (see the display element OLED of FIG. 7) connected with the thin film transistors TFT.

The polarizing layer POL may prevent or reduce external light from being reflected in the display panel PNL.

The pressure sensor PSC may be provided on one surface, for example, a surface in a light emission direction, between both surfaces of the display panel PNL.

The pressure sensor PSC may include a first substrate SUB1, a second substrate SUB2, and a spacer SPC.

The first substrate SUB1 may include a base substrate BS, and receiving electrodes Rx provided on the base substrate BS. The base substrate BS may support the receiving electrodes Rx. That is, the base substrate BS may be the first base substrate BS1 illustrated in FIGS. 2 and 3.

The second substrate SUB2 may include a window WIN, driving electrodes Tx provided on a surface of the window WIN facing the first substrate SUB1, and a variable resistance layer VRL provided on the driving electrodes Tx.

The window WIN may support the driving electrodes Tx. That is, the window WIN may be the second base substrate BS2 illustrated in FIGS. 2 and 3. Furthermore, the window WIN includes a transparent insulating material to allow light to pass through. The window WIN may protect a surface of the display panel PNL.

The spacer SPC may uniformly maintain a gap between the first substrate SUB1 and the second substrate SUB2.

The light shielding layer LSL may prevent or reduce external light passing through the display panel PNL or light generated in the display panel PNL from moving in a direction of the pressure sensor PSC.

As described above, in the pressure sensor PSC, the window WIN of the second substrate SUB2 may serve as the base substrate supporting the driving electrodes Tx. Accordingly, compared to a display device using a separate substrate supporting the driving electrodes Tx, a thickness of the display device including the pressure sensor PSC may be decreased.

Figure 12:
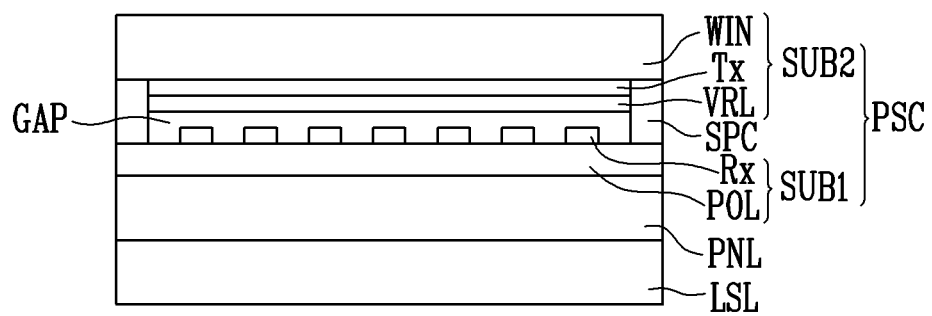

FIG. 12 is a cross-sectional view of an exemplary embodiment of a display device including the pressure sensor illustrated in FIGS. 1, 2, 3, and 4.

Referring to FIG. 12, the display device displaying an image may include a display panel PNL, a pressure sensor PSC provided on one surface between both surfaces of the display panel PNL, and a light shielding layer LSL provided on the other surface between both surfaces of the display panel PNL.

A plurality of pixels may be provided in the display area of the display panel PNL. Furthermore, a plurality of gate lines, and a plurality of data lines crossing the plurality of gate lines may be provided in the display area. Each of the pixels may include one or more thin film transistors TFT (see the transistor TFT of FIG. 7) connected to one of the gate lines and one of the data lines, and a display element OLED (see the display element OLED of FIG. 7) connected with the thin film transistors TFT.

The pressure sensor PSC may be provided on one surface, for example, a surface in a light emission direction, between both surfaces of the display panel PNL.

The pressure sensor PSC may include a first substrate SUB1, a second substrate SUB2, and a spacer SPC.

The first substrate SUB1 may include a polarizing layer POL, and receiving electrodes Rx provided on the polarizing layer POL. The polarizing layer POL may support the receiving electrodes Rx. That is, the polarizing layer POL may be the first base substrate BS2 illustrated in FIGS. 2 and 3.

The second substrate SUB2 may include a window WIN, driving electrodes Tx provided on a surface of the window WIN facing the first substrate SUB1, and a variable resistance layer VRL provided on the driving electrodes Tx.

The window WIN may support the driving electrodes Tx. That is, the window WIN may be the second base substrate BS2 illustrated in FIGS. 2 and 3. Furthermore, the window WIN includes a transparent insulating material to allow light to pass through. The window WIN may protect a surface of the display panel PNL.

The spacer SPC may uniformly maintain a gap between the first substrate SUB1 and the second substrate SUB2.

The light shielding layer LSL may prevent or reduce external light passing through the display panel PNL or light generated in the display panel PNL from moving in a direction of the pressure sensor PSC.

As described above, the window WIN and the polarizing layer POL in the pressure sensor PSC may serve as a base substrate supporting the receiving electrodes Rx and the driving electrodes Tx. Accordingly, compared to a display device using a separate substrate supporting the driving electrodes Tx and the receiving electrodes Rx, a thickness of the display device including the pressure sensor PSC may be decreased.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device, comprising:
a display panel; and
a pressure sensor provided on one surface of the display panel,
wherein the pressure sensor comprises:
a first substrate comprising:

a first base substrate; and
receiving electrodes disposed on the first base substrate, the receiving electrodes extending in a first direction;
a second substrate disposed between the first substrate and the display panel, the second substrate comprising:
a light shielding layer; and
driving electrodes disposed directly on a surface of the light shielding layer facing the first substrate, the driving electrodes extending in a second direction crossing the receiving electrodes; and
a variable resistance layer provided on a surface of one of the driving electrodes and the receiving electrodes,
wherein the light shielding layer is configured to completely block or absorb light from transmitting through.

2. The display device of claim 1, wherein the variable resistance layer comprises:
a polymer resin; and
at least one of a piezo-electric material and a conductive material dispersed within the polymer resin.

3. The display device of claim 2, wherein resistance of the variable resistance layer is decreased according to an increase in a pressure.

4. The display device of claim 2, wherein the pressure sensor further comprises a spacer which uniformly maintains a gap between the first substrate and the second substrate.

5. The display device of claim 1, further comprising:
a cushion layer provided on an external surface of the first base substrate and comprising an elastically deformable material,
wherein the external surface of the first base substrate faces away from the second substrate.

6. The display device of claim 1, wherein the pressure sensor is provided on a surface of the display panel in a direction opposite to a light emission direction.

7. The display device of claim 1, further comprising:
a window provided on a surface of the display panel in a light emission direction.

8. A display device, comprising:
a display panel; and
a pressure sensor provided on one surface of the display panel,
wherein the pressure sensor comprises:
a first substrate comprising:
a first base substrate; and
receiving electrodes disposed on the first base substrate, the receiving electrode extending in a first direction;
a second substrate disposed between the first substrate and the display panel, the second substrate comprising:
a light shielding layer disposed between the display panel and the pressure sensor;
a first cushion layer; and
driving electrodes disposed directly on a surface of the first cushion layer facing the first substrate, the driving electrode extending in a second direction crossing the receiving electrodes; and
a variable resistance layer provided on a surface of one of the driving electrodes and the receiving electrodes,
wherein the first cushion layer comprises an elastically deformable material, and
wherein the light shielding layer is configured to completely block or absorb light from transmitting through.

9. The display device of claim 8, wherein the variable resistance layer comprises:
a polymer resin; and
at least one of a piezo-electric material and a conductive material dispersed within the polymer resin.

10. The display device of claim 9, wherein resistance of the variable resistance layer is decreased according to an increase in a pressure.

11. The display device of claim 9, wherein the pressure sensor is provided on a surface of the display panel in a direction opposite to a light emission direction.

12. The display device of claim 8, further comprising:
a second cushion layer provided on an external surface of the first base substrate and comprises an elastically deformable material.

13. The display device of claim 8, further comprising:
a window provided on a surface of the display panel in a light emission direction.

14. A display device, comprising:
a display panel comprising a light emitting surface configured to emit light;
a pressure sensor provided on the light emitting surface of the display panel; and
a light shielding layer provided on another surface of the display panel, the light shielding layer configured to completely block or absorb light from transmitting through,
wherein the pressure sensor comprises:
a first substrate comprising:
a first base substrate; and
receiving electrodes disposed on the first base substrate, the receiving electrodes extending in a first direction;
a second substrate comprising:
a window; and
driving electrodes disposed on a surface of the window facing the first substrate, the driving electrode extending in a second direction crossing the receiving electrodes; and
a variable resistance layer provided on a surface of one of the driving electrodes and the receiving electrodes,
wherein the first substrate is disposed between the display panel and the second substrate, and
wherein the window is an outermost surface of the display device comprising a material allowing light to pass through.

15. The display device of claim 14, wherein the variable resistance layer comprises a polymer resin, and at least one of a piezo-electric material and a conductive material dispersed within the polymer resin.

16. The display device of claim 15, wherein resistance of the variable resistance layer is decreased according to an increase in a pressure.

17. The display device of claim 15, further comprising:
a polarizing layer provided between the display panel and the first substrate.

18. The display device of claim 15, wherein the first base substrate is a polarizing layer.

* * * * *